UNITED STATES PATENT OFFICE 2,302,345

PRODUCTION OF ALCOHOLS OF THE ACETYLENE SERIES

Otto Pesta, Ludwigshafen-on-the-Rhine, and Friedrich Ebel, Mannheim, Germany, assignors, by mesne assignments, to General Aniline & Film Corporation, New York, N. Y., a corporation of Delaware No Drawing. Application July 8, 1939, Serial No. 283,458. In Germany July 20, 1938

5 Claims. (Cl. 260—635)

The present invention relates to the production of alcohols of the acetylene series, in particular to the production of 2-methylbutine-3-ol-2 and 2.5-dimethylhexine-3-diol-2.5.

It has already been proposed to prepare alcohols of the acetylene series by causing the alkali compounds of acetylene to react with acetone or by causing acetylene to react with alkali compounds of acetone or by bringing together acetylene with acetone in the presence of sodium, sodium alcoholate or sodium amide. The primary products formed are the alkali compounds of alcohols of the acetylene series which, by treatment with water, have then to be converted into the free alcohols. These known methods involve the difficulty that the reaction has to be carried out in the absence of water because, regardless of what kind of starting material is used, at least one of the starting materials is liable to be completely destroyed by the action of water. Sodium acetylide and water easily react to form sodium hydroxide and acetylene, acetone alkali compounds are decomposed by water to form acetone and alkali hydroxide, and sodium, sodium alcoholate and sodium amide are decomposed to form sodium hydroxide and hydrogen, alcohol or ammonia, respectively.

We have now found that alcohols of the acetylene series can be prepared directly from acetone and acetylene in a more simple manner by bringing into contact acetylene with a mixture of acetone and an aqueous solution having an alkaline reaction. The reaction proceeds either with the formation of 2-methylbutine-3-ol-2 according to the equation

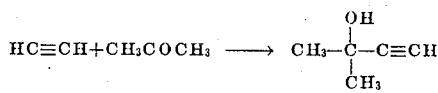

or with the formation of 2.5-dimethylhexine-3-diol-2.5 according to the equation

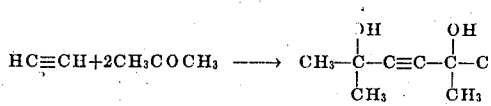

In most cases mixtures of these alcohols are obtained.

The alkaline solutions in which the reaction is carried out are preferably aqueous solutions of compounds of alkali metals which have a strong alkaline reaction, as for example alkali metal hydroxides or alkali metal salts, such as trisodium phosphate, or sodium or potassium carbonate, or sodium phenolate or alkali metal salts of weak organic acids. Aqueous solutions of hydroxides of alkaline earth metals such as calcium or barium hydroxide are also suitable. It is self-understood that such alkaline reacting substances are less suitable which are capable of undergoing irreversible reactions with acetone. The aqueous alkaline solutions may contain in addition to water organic solvents soluble in water though the speed and the course of the reaction is, generally speaking not affected by such additions.

While according to the prior processes, the amount of the alkali metal, alkali alcoholate or alkali amide had to correspond to the amount of the alcohol of the acetylene series to be formed, the reaction according to our invention may be carried out with catalytic amounts of the alkaline reacting substance, or in other words with an amount which is smaller than the equimolecular amount with reference to the amount of acetone converted. The amount of the alkaline reacting substance may be only 50, 25, 10 or 5 per cent by weight or even less of the amount of acetone used.

The acetylene is preferably brought into contact with a mixture of acetone and an aqueous alkaline solution under superatmospheric pressures, for example pressures of 2, 5, 10, 15, 25 or 50 atmospheres. Even higher pressures may be employed in which case, however, it is preferable to employ the acetylene in diluted form because dilute acetylene at high pressures may be more safely handled than pure acetylene. Thus, for example, mixtures of acetylene with inert gases, such as nitrogen or noble gases, or electric arc acetylene which has been freed from higher molecular acetylene hydrocarbons may be used.

The reaction is preferably carried out at moderately elevated temperatures, for example at temperatures exceeding 50° C., e. g. from 70 to 100° C. When working under increased pressure, the temperature may be even higher, provided that the reaction is still capable of being carried through in the liquid phase.

The conversion of the acetone into alcohols of the acetylene series requires some time so that under technical conditions only part of the acetone is converted. It may, therefore, be preferable to work in a cycle while separating part of the reaction mixture at a suitable place, recovering therefrom the mono- or dialcohol or both and returning the unchanged acetone. By also returning to the cycle the 2-methylbutine-3-ol-2 formed, the yield of 2.5-dimethylhexine-3-diol-2.5 may be increased.

The working up of the reaction mixture may be carried out by neutralizing the reaction mixture and subjecting it to a fractional distillation. After having distilled off first water and acetone under normal pressure, the 2-methylbutine-3-ol-2 may be isolated by distillation under normal pressure. From the residue, the 2.5-dimethylhexine-3-diol-2.5 is suitably distilled off in vacuo (boiling point=106–107° C. under 15 millimeters (mercury gage)).

The reaction mixture may also be worked up without neutralization, for example, by salting out the alcohols, together with part of the acetone, separating this mixture from the aqueous layer or by extracting it from the aqueous solution with organic solvents difficultly miscible or immiscible with water. From the mixture of alcohols and acetone thus obtained, the individual alcohols may then be isolated by fractional distillation.

The following examples will further illustrate how this invention may be carried out in practice but the invention is not restricted to these examples. The parts are by weight unless otherwise stated.

Example 1

A mixture of acetylene (3 parts by volume) and nitrogen (1 part by volume) is led under a pressure of 20 atmospheres at 95° C. into a mixture of 800 parts of acetone, 800 parts of water and 17 parts of potassium hydroxide in a pressure-tight stirring vessel. Fresh acetylene is pressed in corresponding to the amount of acetylene reacted. When acetylene is no longer absorbed, the mixture is allowed to cool and then saturated with solid potassium carbonate. The mixture thereafter forms two layers the upper of which is subjected to a distillation. There is obtained unchanged acetone which may be used again, and 100 parts of 1-methylbutine-3-ol-2.

The mixture of acetone, water and potassium hydroxide of the above proportions may also be led in a cycle together with acetylene and nitrogen through a tower which is held under increased pressure. The solution emerging from the tower may be worked up in the manner described.

Example 2

A mixture of acetylene and nitrogen (ratio by volume 3:1) is pressed under 20 atmospheres' pressure into a pressure-tight vessel which is charged with 800 parts of acetone, 800 parts of water and 30 parts of potassium hydroxide, while stirring. The reaction temperature is 100° C. Fresh acetylene is pressed in until it is no longer absorbed. The reaction mixture is allowed to cool, saturated with carbon dioxide and then fractionated under normal pressure. Water and unchanged acetone are the first fractions, 110 parts of 2-methylbutine-3-ol-2 are then obtained. The residue is distilled under 15 millimeters pressure (mercury gauge) whereby 42 parts of 2.5-dimethylhexine-3-diol-2.5 are obtained. It forms crystals which melt at 98° C. after having been recrystallized from cyclohexane.

Instead of potassium hydroxide, there may be used the same amount of sodium hydroxide.

Example 3

A mixture of acetylene and nitrogen (ratio by volume 3:1) is pressed under a pressure of 20 atmospheres into a stirring autoclave at 95° C. which is charged with 880 parts of acetone, 200 parts of water and 260 parts of a 7.7 per cent aqueous solution of potassium hydroxide. When working up the reaction mixture in the manner described in Example 1, first a mixture of water, acetone and 100 parts of 2-methylbutine-3-ol-2 is obtained which is returned to the reaction, and then 24 parts of 2.5-dimethylhexine-3-diol-2.5 are obtained.

Example 4

Acetylene and nitrogen (in the ratio by volume 3:1) are introduced in the manner described in Example 2 into a mixture of 800 parts of acetone, 800 parts of water and 30 parts of potassium carbonate. 2-methylbutine-3-ol-2 is thus formed which may be worked up in the manner described in Example 1.

Instead of potassium hydroxide, the same amount of sodium hydroxide may be used.

Example 5

A mixture of acetylene and nitrogen (ratio by volume 3:1) are introduced under a pressure of 20 atmospheres and at 95° C. into a stirring autoclave which is charged with a mixture of 400 parts of water, 400 parts of acetone and 100 parts of trisodium phosphate ($Na_3PO_4.12H_2O$). Fresh acetylene is pressed in until it is no longer absorbed. The reaction mixture is worked up by distillation, whereby 30 parts of 2-methylbutine-3-ol-2 are obtained.

What we claim is:

1. A process for the production of 2-methylbutine-3-ol-2 and 2.5-dimethylhexine-3-diol-2.5 which comprises bringing into contact acetylene under superatmospheric pressure with a mixture of acetone and an aqueous solution having an alkaline reaction and directly isolating from the reaction mixture the alcohols thereby formed.

2. A process for the production of 2-methylbutine-3-ol-2 and 2.5-dimethylhexine-3-diol-2.5 which comprises bringing into contact a mixture of acetylene and an inert gas under superatmospheric pressure with a mixture of acetone and an aqueous solution having an alkaline reaction and directly isolating from the reaction mixture the alcohols thereby formed.

3. A process for the production of 2-methylbutine-3-ol-2 and 2.5-dimethylhexine-3-diol-2.5 which comprises bringing into contact acetylene under superatmospheric pressure with a mixture of acetone and an aqueous solution of an alkali metal hydroxide and directly isolating from the reaction mixture the alcohols thereby formed.

4. The process as defined in claim 1 wherein the reaction is effected at a temperature of from 70 to 100° C.

5. The process as defined in claim 3 wherein the amount of alkali metal hydroxide is not more than 50 per cent by weight of the amount of acetone.

OTTO PESTA.
FRIEDRICH EBEL.